United States Patent
Weng et al.

(10) Patent No.: US 9,599,355 B2
(45) Date of Patent: Mar. 21, 2017

(54) DRY AIR-WATER HEAT EXCHANGER

(71) Applicant: HER JIU TECHNOLOGY CO., LTD., Taichung (TW)

(72) Inventors: Kuo-Liang Weng, Taichung (TW); Chien-Lun Weng, Taichung (TW); Ling-Hua Weng, Taichung (TW); Ching-Ju Weng, Taichung (TW)

(73) Assignee: HER JIU TECHNOLOGY CO., LTD., Taichung (TW)

( * ) Notice: Subject to any disclaimer, the term of this patent is extended or adjusted under 35 U.S.C. 154(b) by 317 days.

(21) Appl. No.: 14/205,287

(22) Filed: Mar. 11, 2014

(65) Prior Publication Data

US 2015/0260456 A1  Sep. 17, 2015

(51) Int. Cl.
| | |
|---|---|
| F28C 1/00 | (2006.01) |
| F24F 6/02 | (2006.01) |
| F25B 19/04 | (2006.01) |
| F25B 19/00 | (2006.01) |
| F24F 5/00 | (2006.01) |
| F28C 1/04 | (2006.01) |
| F28C 1/14 | (2006.01) |
| F24F 1/00 | (2011.01) |

(52) U.S. Cl.
CPC .............. *F24F 6/02* (2013.01); *F24F 5/0035* (2013.01); *F25B 19/00* (2013.01); *F25B 19/04* (2013.01); *F28C 1/00* (2013.01); *F28C 1/04* (2013.01); *F28C 1/14* (2013.01); *F24F 2001/0085* (2013.01); *F24F 2001/0092* (2013.01)

(58) Field of Classification Search
CPC .... F24F 6/02; F24F 5/0035; F24F 2001/0085; F24F 2001/0092; F25B 19/00; F25B 19/04

See application file for complete search history.

(56) References Cited

U.S. PATENT DOCUMENTS

| | | | |
|---|---|---|---|
| 4,857,090 A * | 8/1989 | Hartness ................ | F24F 5/0035 261/130 |
| 2002/0073720 A1* | 6/2002 | Bourne .................. | F24F 5/0035 62/171 |
| 2005/0133195 A1* | 6/2005 | Weng ..................... | F24F 5/0035 165/53 |
| 2005/0279115 A1* | 12/2005 | Lee ........................ | F24F 1/0007 62/314 |

(Continued)

*Primary Examiner* — Jianying Atkisson
*Assistant Examiner* — David Teitelbaum
(74) *Attorney, Agent, or Firm* — Guice Patents PLLC

(57) ABSTRACT

A dry air-water heat exchanger, wherein a cooling fan, a main tube row, at least an air pre-cooling water tube row, a water evaporator and a catchment chamber are set in a housing, wherein the air pre-cooling water tube row is provided to pre-cool for the entering air, and the water evaporator is provided to evaporate water for heat exchanging after air pre-cooling to thereby lower the temperature of the entering air, and the circulating refrigerant (or the circulating water) inside the main the row is heat exchanged by the main tube row, to thereby perform the high-efficiency cooling process with minimum energy and water consumption, to thereby cool and lower the temperature of the circulating refrigerant (or circulating water), to improve the cooling efficiency of the circulating refrigerant (or circulating water), and achieve the purpose of reducing bacterial growth and scale formation.

3 Claims, 6 Drawing Sheets

(56) References Cited

U.S. PATENT DOCUMENTS

| | | | |
|---|---|---|---|
| 2007/0068668 A1* | 3/2007 | Weng | F24F 12/002 165/226 |
| 2007/0101746 A1* | 5/2007 | Schlom | F24F 5/0007 62/310 |
| 2008/0022709 A1* | 1/2008 | McKee | F24F 5/0035 62/314 |
| 2012/0267091 A1* | 10/2012 | Myers | F28F 27/003 165/279 |

* cited by examiner

DRY AIR-WATER HEAT EXCHANGER

BACKGROUND OF THE INVENTION a) Field of the Invention

The invention relates to a dry air-water heat exchanger and, more particularly, a dry air-water heat exchanger to reduce bacterial growth and scale formation, to thereby improve cooling efficiency of circulating refrigerant (or circulating water).

b) Description of the Prior Art

A system schematic diagram of a conventional chiller system is shown in FIG. 1, which includes a chiller 10, an air bellow 11 and a cooling tower 12, the chiller 10 is used to produce cold water, the air bellow 11 is used to convert cold water produced by the chiller 10 into air, the cooling tower 12 is used to perform heat exchange between circulating water and air and let the circulating water flow into the chiller 10 after being cooled to thereby execute cooling operation for system use. The structure of the conventional cooling tower 12 is opened that the circulating water is directly contacted to air in the environment for heat exchanging. Because there is lack of adequate isolation facilities, biochemical source and bacterial may easily attach inside the cooling tower 12, it causes that bacteria grow continuously. Besides, the high-temperature part of the heat exchanger is directly contacted to cooling water that scale may easily be stored in the internal fittings, the heat exchange efficiency may be reduced, and transport resistance and energy consumption of operation may be increased, so that the flow force of the circulation loop may be reduced and the consumption of operation energy of the chiller may be increased.

SUMMARY OF THE INVENTION

In view of the drawbacks in the prior art, the inventor finally completed the dry air-water heat exchanger, namely, the object of the present invention is to provide a dry air-water heat exchanger that may reduce bacterial growth and scale formation, to thereby improve cooling efficiency of circulating refrigerant (or circulating water).

To achieve the above object according to the invention, a cooling fan, a main tube row, at least an air pre-cooling water tube row, a water evaporator and a catchment chamber are set in a housing, wherein the air pre-cooling water tube row is provided to pre-cool for the entering air, and the water evaporator is provided to evaporate water for heat exchanging after air pre-cooling to thereby lower the temperature of the entering air, and the circulating refrigerant inside the main the row is heat exchanged by the main tube row, to thereby, to thereby cool and lower the temperature of the circulating refrigerant (or circulating water), to improve the cooling efficiency of the circulating refrigerant (or circulating water), and achieve the purpose of reducing bacterial growth and scale formation.

DETAILED DESCRIPTION OF THE PREFERRED EMBODIMENTS

Figure 1:
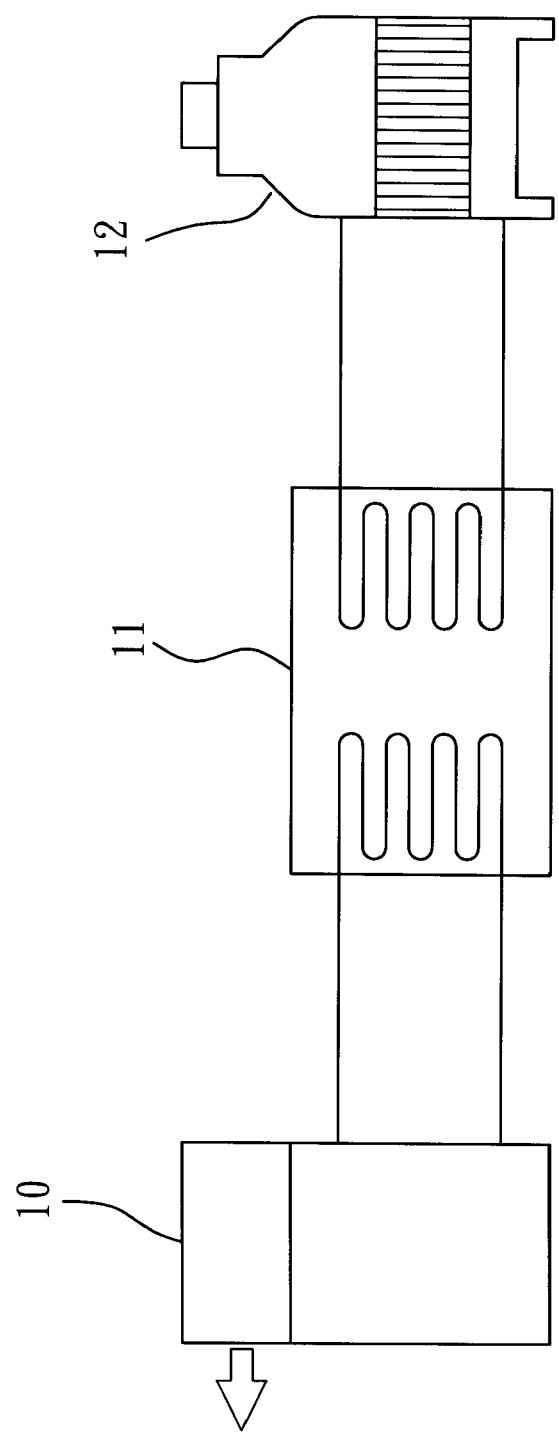
FIG. 1 is a schematic diagram of a conventional chiller system.
Figure 2:
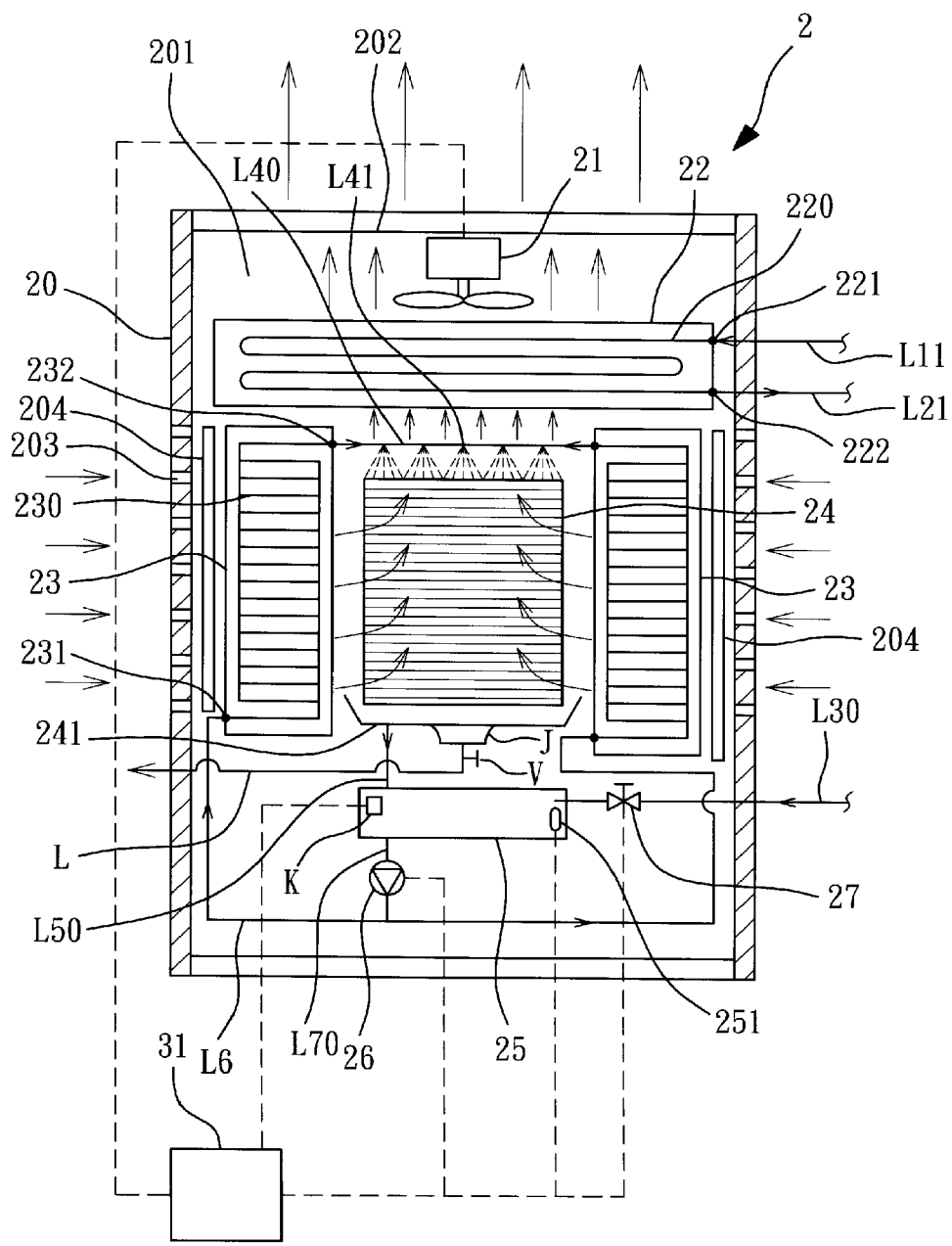
FIG. 2 is a schematic diagram of the first embodiment according to the present invention.

Please refer to FIG. 2, the first embodiment of the present invention is shown, in the dry air-water heat exchanger 2, a cooling fan 21, a main tube row 22, at least an air pre-cooling water tube row 23, a water evaporator 24 and a catchment chamber 25 are set in a housing 20.

The housing 20, which is a hollow cylinder with an inner capacity 201, an air outlet 202 is set on its top, and at least an air inlet 203 is set on the peripheral edge of the housing 20, the air inlet 203 is close to a filter 204.

The cooling fan 21 is set on the air outlet 202 of the housing 20 and is controlled by a controller 31.

The main tube row 22, which is set below the cooling fan 21, is consisted of at least a coil 220, a water inlet end 221 of the coil 220 is connected to a water inlet pipe L11, and a water outlet end 222 of the coil 220 is connected to a water outlet pipe L21 (the water inlet pipe L11 and the water outlet pipe L21 are connected to a chiller, this part is prior art, so it is not shown in figure).

The air pre-cooling water tube row 23, which is set below the main tube row 22, is consisted of at least a coil 230, a water inlet end 231 of the coil 230 is connected to a main connecting pipe L6, a water outlet end 232 of the coil 230 is connected to a spray pipe L40, at least a spray hole L41 is set on the spray pipe L40.

The water evaporator 24, which is set just below the main tube row 22, is a water mist cooling device for producing water evaporation endothermic effect, at least one side of the water mist cooling device is located in a spray area of the spray pipe L40, a drain pan 241 is set on a bottom of the water evaporator 24, and the drain pan 241 is connected to a drain connecting pipe L50.

The catchment chamber 25, which is set below the water evaporator 24, is a closed capacity and communicated with the drain pan 241 through the drain connecting pipe L50, the catchment chamber 25 is connected to the main connecting pipe L6 through a supply connecting pipe L70, a pump 26 is set on the supply connecting pipe L70, a water level sensor 251 is set on the catchment chamber 25 and a fill pipe L30 is externally connected to the catchment chamber 25, a control valve 27 is set on the fill pipe L30, the water level sensor 251, the control valve 27 and the pump 26 are connected to the controller 31 for control thereby.

By the dry air-water heat exchanger 2 consisted of the above components, outside air enters into the air inlet 203 when the cooling fan 21 start operating, passes through the air pre-cooling water tube row 23 for pro-cooling (the temperature of the water inside the air pre-cooling water tube row 23 is lower than the temperature of air, due to heat exchange interaction, air pre-cools and its temperature becomes lower when passing through); and then, air enters into the water evaporator 24, since the water sprayed from the spray hole L41 by the spray pipe L40 forms mist and heat exchanges with air, and it causes the water evaporation effect that the temperature of entered air is quickly lowers down; air passes through the main tube row 22 to let the temperature of the circulating water in the coil 220 lower, and the circulating water flows from the water outlet pipe L21 to the chiller or the process needed to cool down (this part is prior art, not shown in figure).

Besides, the high-temperature circulating water flows out from the chiller, flows into the main tube row 22 through the water inlet pipe L11, and heat exchanges with low-temperature air passed through the water evaporator 24 so that the temperature of the circulating water in the main tube row 22 becomes lower, the circulating water flows to the chiller from the water outlet pipe L21. Since the temperature of heat exchanging in the main tube row 22 is maintained at a low temperature, it is difficult to form scale inside the coil 220, thus the motion of the circulating water may not be blocked. Otherwise, since the circulating water circulates under a closed condition, not in an open way as the conventional cooling tower, which is directly contacted to outside air that bacteria may easily grow. Thus, the present invention may effectively solve the drawbacks of the conventional ones, the cooling efficiency of the circulating water may be improved effectively, and bacterial growth and scale formation may be avoided. Therefore, the drawbacks of the conventional cooling tower may be effectively improved, and the present invention may be provided in use of the refrigeration and air conditioning systems and the industrial cooling processes.

As for the drain pan 241 in the bottom of the water evaporator 24, it is provided to collect the water sprayed on the water evaporator 24 by the spray pipe L40 (at this time, the water temperature drops after water evaporation effect), and the water flows into the catchment chamber 25 through the drain connecting pipe L50. The pump 26 on the supply connecting pipe L70 is provided to transfer the water in the catchment chamber 25 to the air pre-cooling water tube row 23 for pre-cooling the outside air passing through. The water flows to the spray hole L41 of the spray pipe L40 and is sprayed on the water evaporator 24, and is collected to the catchment chamber 25 by the drain pan 241. The water level sensor 251 of the catchment chamber 25 continuously senses the water level, once when the water level is lower than a predetermined amount, the controller 31 opens the control valve 27 to fill water by the fill pipe L30 until that the water level sensed by the water level sensor 25 reaches the predetermined amount, and the controller 31 closes the control valve 27 to stop filling water.

The dry air-water heat exchanger 2 of the present invention, when the temperature of the circulating water in the main tube row 22 reaches a predetermined low-temperature value (the low-temperature value may be set up according to usage requirements, generally less than 25° C.). The controller 31 stops the pump 26 for stopping water evaporation to enhance cooling operation, to thereby achieve the effect of saving water and energy. Besides, when the temperature of the circulating water in the main tube row 22 reaches a predetermined high-temperature value (the high-temperature value may be set up according to usage requirements, generally higher than 30° C.). The controller 31 controls the pump 26 to speed up, to enhance the capability of water evaporating and circulating to thereby improve its cooling efficiency.

Figure 3:
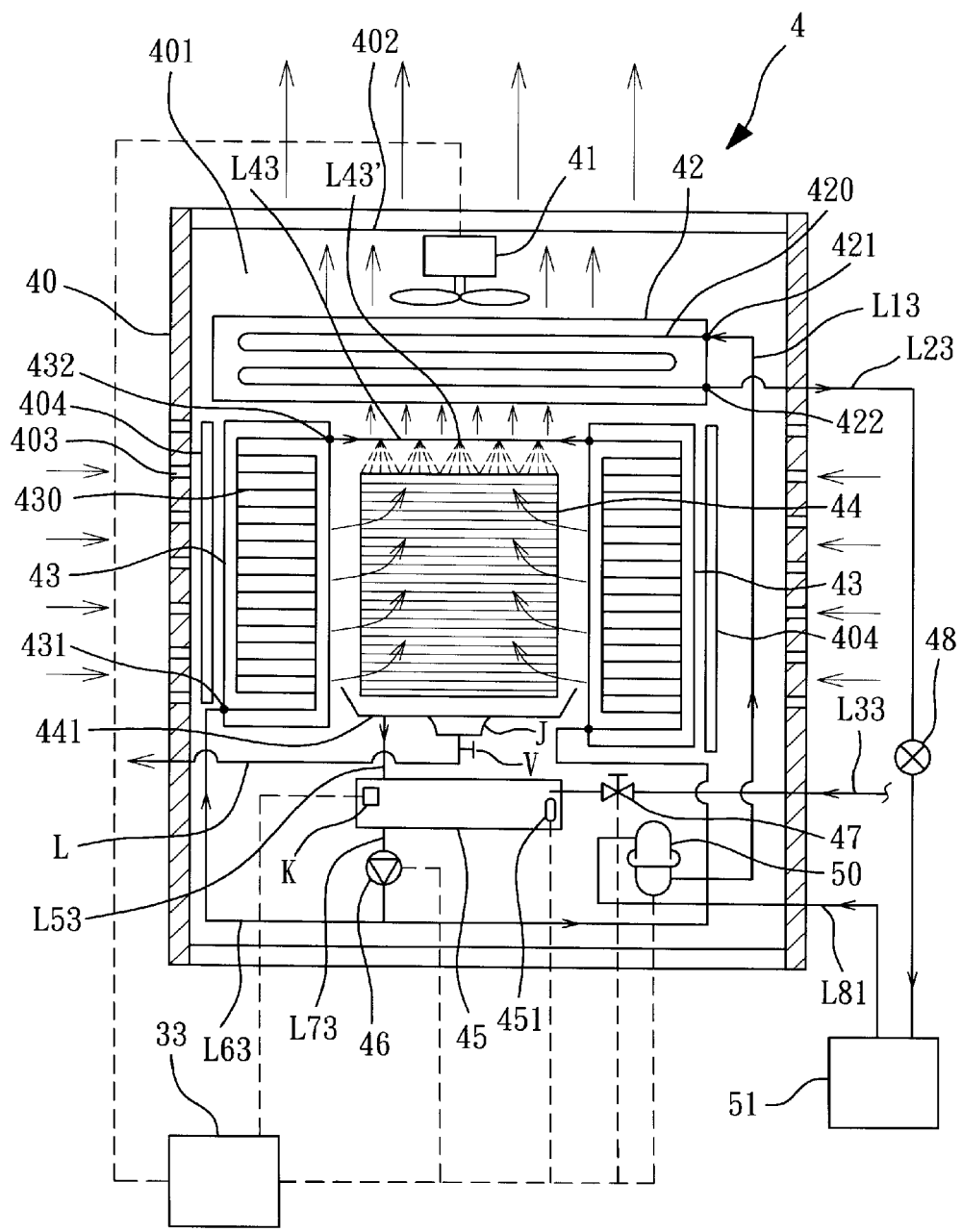
FIG. 3 is a schematic diagram of the second embodiment according to the present invention.

The second embodiment of the present invention is shown as FIG. 3, and it is the embodiment of the present invention combined with a compressor 50 as an air water cooling system, in the dry air-water heat exchanger 4, a cooling fan 41, a main tube row 42, at least an air pre-cooling water tube row 43, a water evaporator 44, a catchment chamber 45 and the compressor 50 are set in a housing 40.

The housing 40, which is a hollow cylinder with an inner capacity 401, an air outlet 402 is set on its top, and at least an air inlet 403 is set on the peripheral edge of the housing 40, the air inlet 403 is close to a filter 404.

The cooling fan 41 is set on the air outlet 402 of the housing 40 and is controlled by a controller 33.

The main tube row 42, which is set below the cooling fan 41, is consisted of at least a coil 420, a water inlet end 421 of the coil 420 is connected to a first refrigerant pipe L13 and a second end 422 of the coil 420 is connected to a second refrigerant pipe L23, the other end of the second refrigerant pipe L23 is connected to an indoor heat exchanger 51, a refrigerant flow controller 48 is set on the second refrigerant pipe L23.

The air pre-cooling water tube row 43, which is set below the main tube row 42, is consisted of at least a coil 430, a water inlet end 431 of the coil 430 is connected to a main connecting pipe L63, a water outlet end 432 of the coil 430 is connected to a spray pipe L43, at least a spray hole L43' is set on the spray pipe L43.

The water evaporator 44, which is set just below the main tube row 42, is a water mist cooling device for producing water evaporation endothermic effect, at least one side of the water mist cooling device is located in a spray area of the spray hole L43', a drain pan 441 is set on a bottom of the water evaporator 44, and the drain pan 441 is connected to a drain connecting pipe L53.

The catchment chamber 45, which is set below the water evaporator 44, is a closed capacity and communicated with the drain pan 441 through the drain connecting pipe L53, the catchment chamber 45 is connected to the main connecting pipe 63 through a supply connecting pipe L73, a pump 46 is set on the supply connecting pipe L73, a water level sensor 451 is set on the catchment chamber 45 and a fill pipe L33 is externally connected to the catchment chamber 45, a control valve 47 is set on the fill pipe L33, the water level sensor 451, the control valve 47 and the pump 46 are connected to the controller 33 for control thereby.

The compressor 50, which is a power source for circulating refrigerant, circulating refrigerant is output to the main tube row 42 through the first refrigerant pipe L13, and a third refrigerant pipe L81 is used to retrieve refrigerant, the other end of the third refrigerant pipe L81 is connected to the indoor heat exchanger 51.

By the dry air-water heat exchanger 4 consisted of the above components, outside air enters into the air inlet 403 when the cooling fan 41 start operating, passes through the air pre-cooling water tube row 43 for pro-cooling (the temperature of the water inside the air pre-cooling water tube row 43 is lower than the temperature of air, due to heat exchange interaction, air pre-cools and its temperature becomes lower when passing through); and then, air enters into the water evaporator 44, since the water sprayed from the spray hole L43' forms mist and heat exchanges with air, and it causes the water evaporation effect that the temperature of entered air is quickly lowers down; air passes through the main tube row 42 to let the temperature of the circulating refrigerant in the main tube row 42 lower, and enters into the indoor heat exchanger 51 from the second refrigerant pipe L23, and then the high-temperature circulating refrigerant flows out from the indoor heat exchanger 51 and flows back to the compressor 50 by the third refrigerant pipe L81, the compressor 50 then sends the refrigerant into the main tube row 42 through the first refrigerant pipe L13 for cooling. Thus, the main tube row 42 has the function as the condensing unit of the air-water cooling system when the dry water-cooling device 4 is combined with the compressor 50, and it may be applied to heat removal of the refrigeration and air conditioning system.

As for the drain pan 441 in the bottom of the water evaporator 44, it is provided to collect the water sprayed on the water evaporator 44 by the spray hole L43' (at this time, the water temperature drops after water evaporation effect), and the water flows into the catchment chamber 45 through the drain connecting pipe L53. The pump 46 on the supply connecting pipe L73 is provided to transfer the water in the catchment chamber 45 to the air pre-cooling water tube row 43 through the main connecting pipe L63 for pre-cooling the outside air passing through. The water flows to the spray hole L43' of the spray pipe L43 and is sprayed on the water evaporator 44, and is collected to the catchment chamber 45 by the drain pan 441. The water level sensor 451 of the catchment chamber 45 senses the water level continuously, once when the water level is lower than a predetermined amount, the controller 33 opens the control valve 47 to fill water by the fill pipe L33 until that the water level sensed by the water level sensor 451 reaches the predetermined amount, and the controller 33 closes the control valve 47 to stop filling water.

Figure 4:
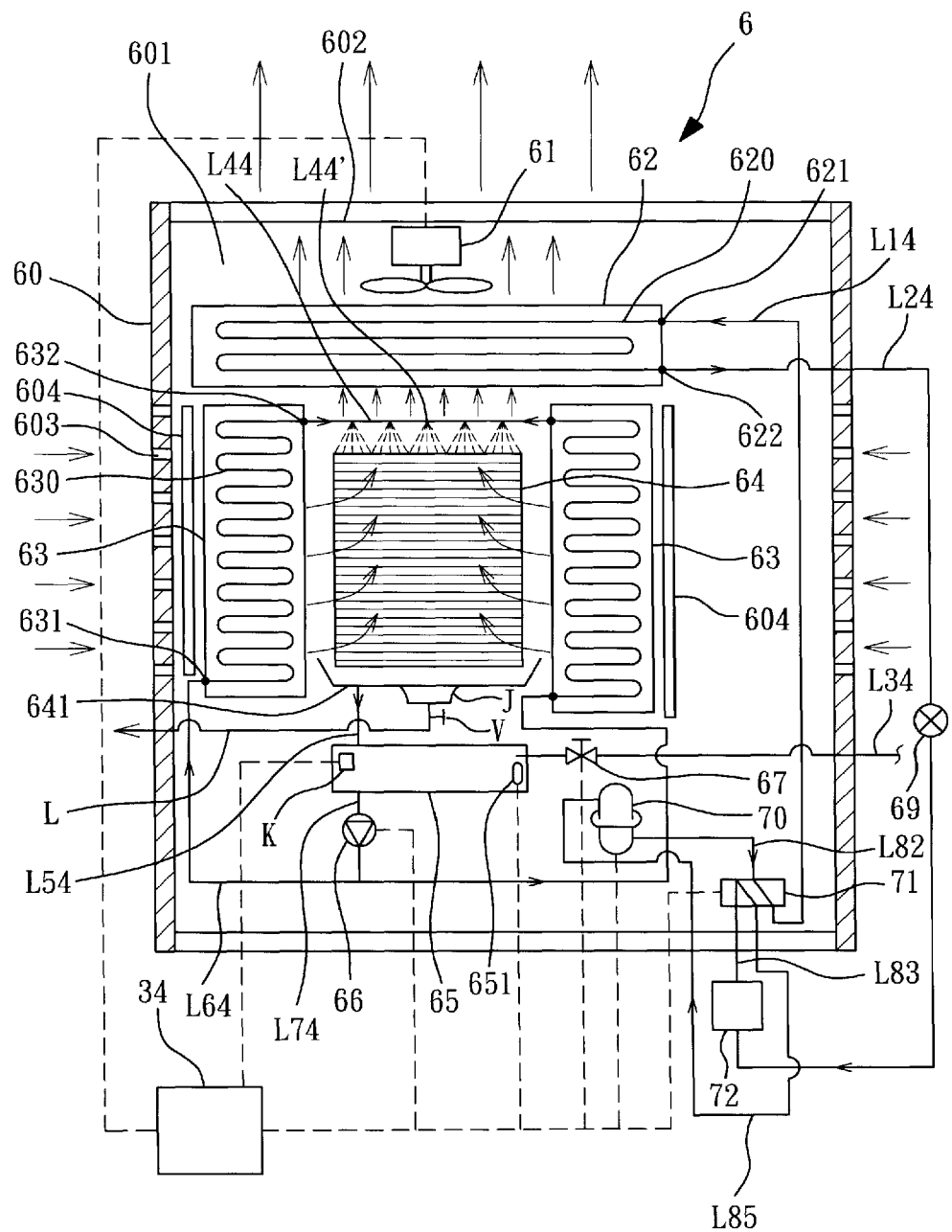
FIG. 4 is a schematic diagram (1) of the third embodiment according to the present invention.
Figure 5:
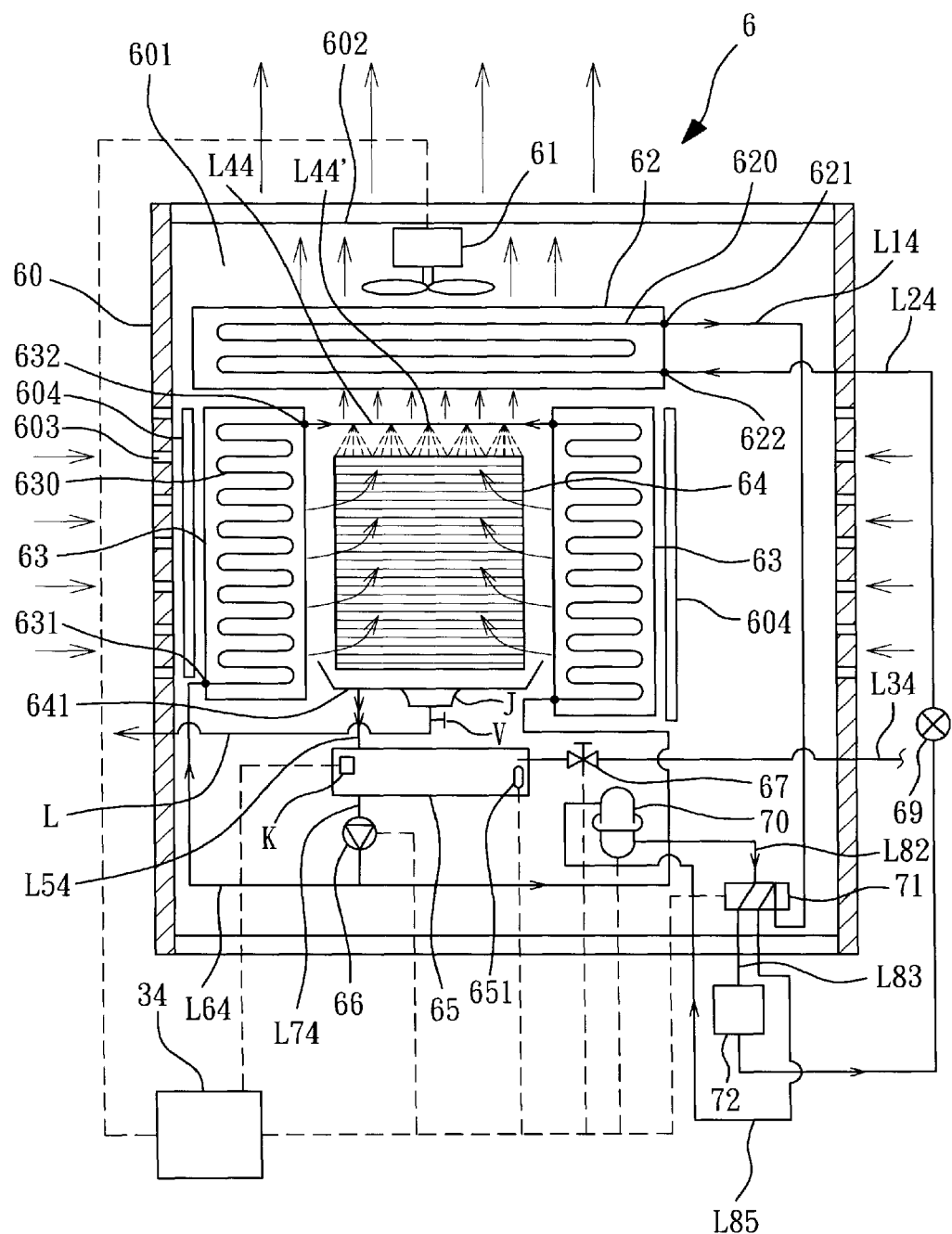
FIG. 5 is a schematic diagram (2) of the third embodiment according to the present invention.

The third embodiment of the present invention is shown as FIG. 4 and FIG. 5, it is the embodiment of the present invention combined with a compressor 70 and a switching valve 71 as a heating and air conditioning equipment, in the dry air-water heat exchanger 6, a cooling fan 61, a main tube row 62, at least an air pre-cooling water tube row 63, a water evaporator 64, a catchment chamber 65, the compressor 70 and the switching valve 71 are set in a housing 60.

The housing 60, which is a hollow cylinder with an inner capacity 601, an air outlet 602 is set on its top, and at least an air inlet 603 is set on the peripheral edge of the housing 60, the air inlet 603 is close to a filter 604.

The cooling fan 61 is set on the air outlet 602 of the housing 60 and is controlled by a controller 34.

The main tube row 62, which is set below the cooling fan 61, is consisted of at least a coil 620, a first end 621 of the coil 620 is connected to a first refrigerant pipe L14 and a second end 622 of the coil 620 is connected to a second refrigerant pipe L24, the other end of the second refrigerant pipe L24 is connected to an indoor heat exchanger 72, a refrigerant flow controller 69 is set on the second refrigerant pipe L24.

The air pre-cooling water tube row 63, which is set below the main tube row 62, is consisted of at least a coil 630, a water inlet end 631 of the coil 630 is connected to a main connecting pipe L64, a water outlet end 632 of the coil 630 is connected to a spray pipe L44, at least a spray hole L44' is set on the spray pipe L44.

The water evaporator 64, which is set just below the main tube row 62, is a water mist cooling device for producing water evaporation endothermic effect, at least one side of the water mist cooling device is located in a spray area of the spray pipe L44, a drain pan 641 is set on a bottom of the water evaporator 64, and the drain pan 641 is connected to a drain connecting pipe L54.

The catchment chamber 65, which is set below the water evaporator 64, is a closed capacity and communicated with the drain pan 641 through the drain connecting pipe L54, the bottom of the catchment chamber 65 is connected to a supply connecting pipe L74, a pump 66 is set on the supply connecting pipe L74, and the supply connecting pipe L74 is connected to the main connecting pipe L64, a water level sensor 651 is set on the catchment chamber 65 and a fill pipe L34 is externally connected to the catchment chamber 65, a control valve 67 is set on the fill pipe L34, the water level sensor 651, the control valve 67 and the pump 66 are connected to the controller 34 for control thereby.

The compressor 70, which is a power source for circulating refrigerant, circulating refrigerant is output from a third refrigerant pipe L82, the other end of the third refrigerant pipe L82 is connected to the switching valve 71, a fifth refrigerant pipe L85 is provided to transfer circulating refrigerant to the compressor 70, the other end of the fifth refrigerant pipe L85 is connected to the switching valve 71.

the switching valve 71 is controlled by a controller 34 for switching the path and direction that refrigerant may pass through, the switching valve 71 is connected to an indoor heat exchanger 72 through a fourth refrigerant pipe L83.

By the dry air-water heat exchanger 6 consisted of the above components, if the refrigeration circulation is needed (as shown in FIG. 4), the controller 34 switches the switching valve 71 to a valve position of the refrigeration circulation, the circulation refrigerant of the compressor 70 is output from the third refrigerant pipe L82, passes through the switching valve 71 and enters into the main tube row 62 from the first refrigerant pipe L14 (at this time, the main tube row 62 is equal to a condensing unit), then the circulation refrigerant is output the main tube row 62, passes through the second refrigerant pipe L24 and the refrigerant flow controller 69, flows to the indoor heat exchanger 72 (at this time, the indoor heat exchanger 72 is equal to an evaporator), and passes the fourth refrigerant pipe L83, the switching valve 71, and finally flows back to the compressor 70 through the fifth refrigerant pipe L85, to complete a refrigerant circulation for refrigeration. Besides, indoor air enters from the air inlet 603 due to the motion of the cooling fan 61, passes through the air pre-cooling water tube row 63 for pre-cooling (the temperature of the water inside the air pre-cooling water tube row is lower than the temperature of the air, due to the heat exchange effect, the air is pre-cooled and its temperature becomes lower when passing through); and then the air enters into the water evaporator 64, since the water sprayed from the spray hole L44' by the spray pipe L44 forms mist and heat exchanges with air, and it causes the water evaporation effect that the temperature of entered air is quickly lowers down; air passes through the main tube row 62 to let the temperature of the circulating refrigerant in the main tube row 62 lower. And the circulating refrigerant flows into the main tube row 62 from the first refrigerant pipe L14, heat exchanges with the low-temperature air passed through the water evaporator 64 and its temperature becomes lower, and then flows into the indoor heat exchanger 72 from the second refrigerant pipe L24 to supply the required cold energy.

If the heating circulation is needed (as shown in FIG. 5), the controller 34 switches the switching valve 71 to a valve position of the heating circulation, the circulation refrigerant of the compressor 70 is output from the third refrigerant pipe L82, passes through the switching valve 71 and enters into the indoor heat exchanger 72 from the fourth refrigerant pipe L83 (at this time, the indoor heat exchanger 72 is equal to a condensing unit), and the circulation refrigerant passes through the second refrigerant pipe L24 and the refrigerant flow controller 69, and then flows into the main tube row 62 (at this time, the indoor heat exchanger 72 is equal to an evaporator). In the heating circulation, the air pre-cooling water tube row 63, the water evaporator 64 and the pump 66 do not act, the entered air is guided to pass through the main tube row 62 by the motion of the cooling fan 61 and heat exchanges with the passed refrigerant, so that the temperature of the refrigerant flowed into the main tube row 62 from the second refrigerant pipe L24 rises, the refrigerant flows out from the first refrigerant pipe L14 and flows back to the compressor 70 from the fifth refrigerant pipe L83 to complete a heating refrigerant circulation.

Figure 6:
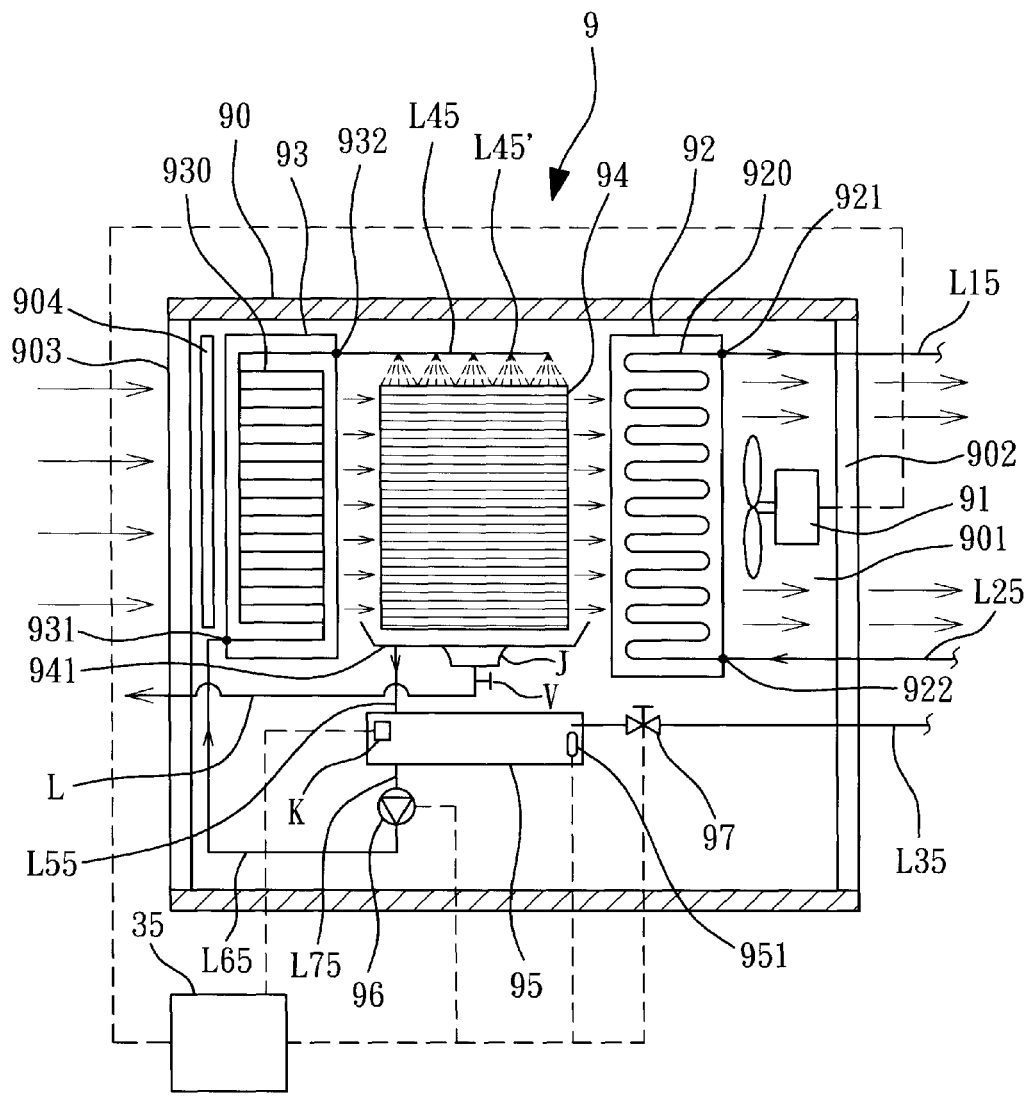
FIG. 6 is a schematic diagram of the fourth embodiment according to the present invention.

Specific implementations of the above embodiments according to the present invention are configured as a vertical structure. Similarly, the configuration may be adjusted to a horizontal structure from the vertical structure according to actual needs. Herein, the specific embodiment adjusted from the first embodiment as a horizontal structure is as follow. Please refer to FIG. 6, in the dry air-water heat exchanger 9, a cooling fan 91, a main tube row 92, at least an air pre-cooling water tube row 93, a water evaporator 94, a catchment chamber 95 are set in a housing 90.

The housing 90, which is a hollow cylinder with an inner capacity 901, an air outlet 902 is set on its top, and at least an air inlet 903 is set on the peripheral edge of the housing 90, the air inlet 903 is close to a filter 904.

The cooling fan 91 is set on the air outlet 902 of the housing 90 and is controlled by a controller 35.

The main tube row 92, which is set in front of the cooling fan 91, is consisted of at least a coil 920, a water inlet end 921 of the coil 920 is connected to a water outlet pipe L15 and a water outlet end 922 of the coil 920 is connected to a water inlet pipe L25.

The air pre-cooling water tube row 93, which is set below the main tube row 92, is consisted of at least a coil 930, a water inlet end 931 of the coil 930 is connected to a main connecting pipe L65, a water outlet end 932 of the coil 930 is connected to a spray pipe L45, at least a spray hole L45' is set on the spray pipe L45.

The water evaporator 94, which is set between the main tube row 92 and the air pre-cooling water tube row 93, is a water mist cooling device for producing water evaporation endothermic effect, it is located in a spray area of the spray pipe L45, a drain pan 941 is set on a bottom of the water evaporator 94, and the drain pan 941 is connected to a drain connecting pipe L55.

The catchment chamber 95, which is set below the water evaporator 94, is a closed capacity and communicated with the drain pan 941 through the drain connecting pipe L55, the catchment chamber 95 is connected to the main connecting pipe L65 through a supply connecting pipe L75, a pump 96 is set on the supply connecting pipe L75, a water level sensor 951 is set on the catchment chamber 95 and a fill pipe L35 is externally connected to the catchment chamber 95, a control valve 97 is set on the fill pipe L35, the water level sensor 951, the control valve 97 and the pump 96 are connected to the controller 35 for control thereby.

By the dry air-water heat exchanger 9 consisted of the above components, outside air enters into the air inlet 903 when the cooling fan 91 start operating, passes through the air pre-cooling water tube row 93 for pro-cooling (the temperature of the water inside the air pre-cooling water tube row 93 is lower than the temperature of air, due to heat exchange interaction, air pre-cools and its temperature becomes lower when passing through); and then, air enters into the water evaporator 94, since the water sprayed from the spray hole L45' by the spray pipe L45 forms mist and heat exchanges with air, and it causes the water evaporation effect that the temperature of entered air is quickly lowers down; air passes through the main tube row 92 to let the temperature of the circulating water in the coil 920 lower, and the circulating water flows from the water outlet pipe L25 to the chiller or the process needed to cool down (this part is prior art, not shown in figure).

Besides, the high-temperature circulating water flows out from the chiller, flows into the main tube row 92 through the water inlet pipe L15, and heat exchanges with low-temperature air passed through the water evaporator 94 so that the temperature of the circulating water in the main tube row 92 becomes lower, the circulating water flows to the chiller from the water inlet pipe L25. Since the temperature of heat exchanging in the main tube row 92 is maintained at a low temperature, it is difficult to form scale inside the coil 920, thus the motion of the circulating water may not be blocked. Otherwise, since the circulating water circulates under a closed condition, not in an open way as the conventional cooling tower, which is directly contacted to outside air that bacteria may easily grow. Thus, the present invention may effectively solve the drawbacks of the conventional ones, the cooling efficiency of the circulating water may be improved effectively, and bacterial growth and scale formation may be avoided. Therefore, the drawbacks of the conventional cooling tower may be effectively improved, and the present invention may be provided in use of the refrigeration and air conditioning systems and the industrial cooling processes.

As for the drain pan 941 in the bottom of the water evaporator 94, it is provided to collect the water sprayed on the water evaporator 94 by the spray pipe L45 (at this time, the water temperature drops after water evaporation effect), and the water flows into the catchment chamber 95 through the drain connecting pipe L55. The pump 96 on the supply connecting pipe L95 is provided to transfer the water in the catchment chamber 95 to the air pre-cooling water tube row 93 for pre-cooling the outside air passing through. The water flows to the spray hole L45' of the spray pipe L45 and is sprayed on the water evaporator 94, and is collected to the catchment chamber 95 by the drain pan 941. The water level sensor 951 of the catchment chamber 95 senses the water level continuously, once when the water level is lower than a predetermined amount, the controller 35 opens the control valve 97 to fill water by the fill pipe L35 until that the water level sensed by the water level sensor 951 reaches the predetermined amount, and the controller 35 closes the control valve 97 to stop filling water.

The dry air-water heat exchanger 9 of the present invention, when the temperature of the circulating water in the main tube row 92 reaches a predetermined low-temperature value (the low-temperature value may be set up according to usage requirements, generally less than 25° C.). The controller 35 stops the pump 96 for stopping water evaporation to enhance cooling operation, to thereby achieve the effect of saving water and energy. Besides, when the temperature of the circulating water in the main tube row 92 reaches a predetermined high-temperature value (the high-temperature value may be set up according to usage requirements, generally higher than 30° C.). The controller 35 controls the pump 96 to speed up, to enhance the capability of water evaporating and circulating to thereby improve its cooling efficiency.

Also, in the above embodiments of the present invention, in order to ensure that the circulating water (or refrigerant) does not cause the problem of bacteria growth in the catchment chamber 25, 45, 65, 95, a sterilizer K may be connected to the catchment chamber 25, 45, 65, 95, the sterilizer K is an UV lamp (or an odor machine, an anion machine).

Further, in the above embodiments according to the present invention, wherein a sewage plant is connected to the bottom of the drain pan 241, 441, 641, 941, the sewage plant is further connected to a overflow pipe L, and a manual valve V is set on the overflow pipe L. When sewage and sediment in the drain pan 241, 441, 641, 941 are needed to be discharged, users may open the manual valve V and close it after completing discharge. Except for discharging sewage and sediment, the overflow pipe L may be used as a drainage channel for overflow of the drain pan 241, 441, 641, 941.

Above all, in the present invention, the air pre-cooling water tube row is provided to pre-cool and the water evaporator is provided to evaporate water for heat exchanging, to lower the temperature of the entering air, and the circulating refrigerant inside the main the row is heat exchanged by the main tube row, to thereby cool and lower the temperature of the circulating refrigerant (or circulating water), to improve the cooling efficiency of the circulating refrigerant (or circulating water). Simultaneously, the circulating refrigerant (or circulating water) is not directly contacted to outside air, so cooling water is collected in the catchment chamber when the chiller stops operation, thus it may avoid bacterial growth and scale formation and the drawbacks of the conventional ones may be solved. At the same time, a compressor is combined as an air-water condensing unit, which is used to remove heat to the external environment for refrigeration and air conditioning systems, and further, a switching valve is combined as an air-water heating and air conditioning equipment. Therefore, the present invention has novelty and practical progress.

What is claimed is:

1. A dry air-water heat exchanger comprising:
    a cooling fan, a main tube row, at least an air pre-cooling water tube row, a water evaporator and a catchment chamber located in a housing;
    the housing is a hollow cylinder with an inner capacity, and includes an air outlet located on a top of the housing, and at least an air inlet located on a peripheral edge of the housing;
    the cooling fan is located on the air outlet of the housing and is controlled by a controller;
    the main tube row is located below the cooling fan, and includes at least a first coil, wherein a main tube row water inlet end of the first coil is connected to a main tube row water inlet pipe, and a main tube row water outlet end of the first coil is connected to a main tube row water outlet pipe;
    the air pre-cooling water tube row is located below the main tube row, and includes at least a second coil and a spray pipe, wherein an air pre-cooling water tube row water inlet end of the second coil is connected to an air pre-cooling water tube row main connecting pipe, an air pre-cooling water tube row water outlet end of the second coil is connected to the spray pipe;
    the water evaporator is located directly below the main tube row, and is a water mist cooling device for producing water evaporation endothermic effect, at least one side of the water mist cooling device is located in a spray area of the spray pipe, a drain pan is located on a bottom of the water evaporator, and the drain pan is connected to a drain connecting pipe;
    the catchment chamber is located below the water evaporator, and is a closed capacity and communicates with the drain pan through the drain connecting pipe, a supply connecting pipe is connected to the bottom of the catchment chamber, a pump is located on the supply connecting pipe, a water level sensor is located on the catchment chamber and a fill pipe is externally connected to the catchment chamber, a control valve is located on the fill pipe, the water level sensor, the control valve and the pump are connected to the controller for control of the water level sensor, the control valve, and the pump;
    wherein the air pre-cooling water tube row is located adjacent to the water evaporator and the main tube row is located directly above and extending over the air pre-cooling water tube row and the water evaporator;
    wherein an air flow enters into the housing through the air inlet, and flows through the air pre-cooling water tube row, the water evaporator, and the main tube row, and exists the housing through the air outlet.

2. The dry air-water heat exchanger as claimed in claim 1, wherein the air inlet is close to a filter.

3. The dry air-water heat exchanger as claimed in claim 1, wherein at least a spray hole is located on the spray pipe.

* * * * *